(12) United States Patent
Decrop et al.

(10) Patent No.: US 12,184,915 B2
(45) Date of Patent: Dec. 31, 2024

(54) METHOD FOR PERSONALIZED BROADCASTING

(71) Applicant: International Business Machines Corporation, Armonk, NY (US)

(72) Inventors: Clement Decrop, Arlington, VA (US); Olivia Monroe, Washington, DC (US); Daniel Austin Harting, Chesapeake Beach, MD (US); Benjamin Joseph DeLeo, Arlington, VA (US); Justin Wu, Rockville, MD (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 18/146,481

(22) Filed: Dec. 27, 2022

(65) Prior Publication Data

US 2024/0214620 A1    Jun. 27, 2024

(51) Int. Cl.
*H04N 21/25* (2011.01)
*H04N 21/233* (2011.01)
*H04N 21/234* (2011.01)
*H04N 21/258* (2011.01)
*H04N 21/2668* (2011.01)
*H04N 21/81* (2011.01)

(52) U.S. Cl.
CPC ......... *H04N 21/252* (2013.01); *H04N 21/233* (2013.01); *H04N 21/23418* (2013.01); *H04N 21/25891* (2013.01); *H04N 21/2668* (2013.01); *H04N 21/8106* (2013.01)

(58) Field of Classification Search
None
See application file for complete search history.

(56) References Cited

U.S. PATENT DOCUMENTS

| 8,656,425 | B2 | 2/2014 | Wang |
| 9,583,141 | B2 | 2/2017 | Cohen |
| 10,748,515 | B2 | 8/2020 | Kolen |
| 11,122,341 | B1 | 9/2021 | Decrop |
| 11,206,453 | B2 | 12/2021 | Ramos |
| 2007/0279494 | A1 | 12/2007 | Aman |

(Continued)

FOREIGN PATENT DOCUMENTS

| CN | 110931045 A | 3/2020 |
| WO | 2021073416 A1 | 4/2021 |

OTHER PUBLICATIONS

"IBM Watson Knowledge Studio", IBM, downloaded from the Internet on Sep. 20, 2022, 9 pages, <https://www.ibm.com/cloud/watson-knowledge-studio>.

(Continued)

*Primary Examiner* — James R Marandi
(74) *Attorney, Agent, or Firm* — Jordan T. Schiller

(57) ABSTRACT

A computer-implemented method for generating personalized multimedia, is disclosed. The computer-implemented method includes determining one or more multimedia preferences associated with a user. The computer-implemented method further includes analyzing multimedia data to generate a personalized audio output based, at least in part, on the one or more multimedia preferences associated with the user. The computer-implemented method further includes modifying the multimedia data to include the generated personalized audio output using a generative adversarial network.

20 Claims, 5 Drawing Sheets

(56) References Cited

U.S. PATENT DOCUMENTS

| | | |
|---|---|---|
| 2015/0297949 A1 | 10/2015 | Aman |
| 2017/0200065 A1* | 7/2017 | Wang .................. G06V 10/764 |
| 2020/0313782 A1 | 10/2020 | Kolen |
| 2022/0167075 A1* | 5/2022 | Paiement ............. H04R 1/1091 |
| 2022/0254368 A1 | 8/2022 | Waine |

OTHER PUBLICATIONS

"The US Open and IBM", IBM, downloaded from the Internet on Sep. 20, 2022, 4 pages, <https://www.ibm.com/sports/>.

"Watson Media Live Streaming and Video Hosting Solutions", IBM, downloaded from the Internet Sep. 20, 2022, <https://www.ibm.com/watson/media>, 8 pages.

"Watson Text to Speech", IBM, downloaded from the Internet on Sep. 20, 2022, 9 pages, <https://www.ibm.com/cloud/watson-text-to-speech>.

Acien et al., "BeCAPTCHA: Detecting Human Behavior in Smartphone Interaction using Multiple Inbuilt Sensors", arXiv preprint arXiv:2002.00918 (2020), 8 pages.

Chen et al., "Improving Speech Recognition using GaN-based Speech Synthesis and Contrastive Unspoken Text Selection", Interspeech 2020, Oct. 25-29, 2020, Shanghai, China, pp. 556-560, <http://dx.doi.org/10.21437/Interspeech.2020-1475>.

Wikipedia, "Broadcasting of sports events", This page was last edited on Sep. 11, 2022, 10 pages, <https://en.wikipedia.org/wiki/Broadcasting_of_sports_events>.

Wikipedia, "Generative adversarial network", This page last edited on Sep. 14, 2022, 34 pages, <https://en.wikipedia.org/wiki/Generative_adversarial_network >.

\* cited by examiner

METHOD FOR PERSONALIZED BROADCASTING

BACKGROUND

The present invention relates generally to the field of broadcasting multimedia, and more particularly to, broadcasting personalized multimedia based, at least in part, on user preferences.

Many national local media broadcasting is broadcasted on a live or prerecorded network. In some cases, broadcasted events, shows, or news are primarily shown by regional network groups (i.e., networks which air telecasts for teams of local interest) which are usually only carried within the relevant market. For example, cable channels exist that are dedicated to specific types of sports, certain college sport conferences, or a specific league. Pay-per-view broadcasts are typically restricted to one-time sporting events such as boxing, mixed martial arts, or professional wrestling.

Some shows have a TV talk show host, also called a TV personality, which is the person who presents a television show. They may lead their own talk show where they invite guests to discuss a variety of topics, or they can work on a network show with other presenters. Sport events or games sometimes have a sports commentator (also known as sports announcer or sportscaster) that provides real-time commentary of a game or event, usually during a live broadcast, traditionally delivered in the historical present tense.

SUMMARY

According to one embodiment of the present invention, a computer-implemented method for generating personalized multimedia is disclosed. The computer-implemented method includes determining one or more multimedia preferences associated with a user. The computer-implemented method further includes analyzing multimedia data to generate a personalized audio output based, at least in part, on the one or more multimedia preferences associated with the user. The computer-implemented method further includes modifying the multimedia data to include the generated personalized audio output using a generative adversarial network.

According to another embodiment of the present invention, a computer program product for generating personalized multimedia is disclosed. The computer program product includes one or more computer readable storage media and program instructions stored on the one or more computer readable storage media. The program instructions include instructions to determine one or more multimedia preferences associated with a user. The program instructions further include instructions to analyze multimedia data to generate a personalized audio output based, at least in part, on the one or more multimedia preferences associated with the user. The program instructions further include instructions to modify the multimedia data to include the generated personalized audio output using a generative adversarial network.

According to another embodiment of the present invention, a computer system for generating personalized multimedia is disclosed. The computer system includes one or more computer processors, one or more computer readable storage media, and computer program instructions, the computer program instructions being stored on the one or more computer readable storage media for execution by the one or more computer processors. The program instructions include instructions to determine one or more multimedia preferences associated with a user. The program instructions further include instructions to analyze multimedia data to generate a personalized audio output based, at least in part, on the one or more multimedia preferences associated with the user. The program instructions further include instructions to modify the multimedia data to include the generated personalized audio output using a generative adversarial network.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
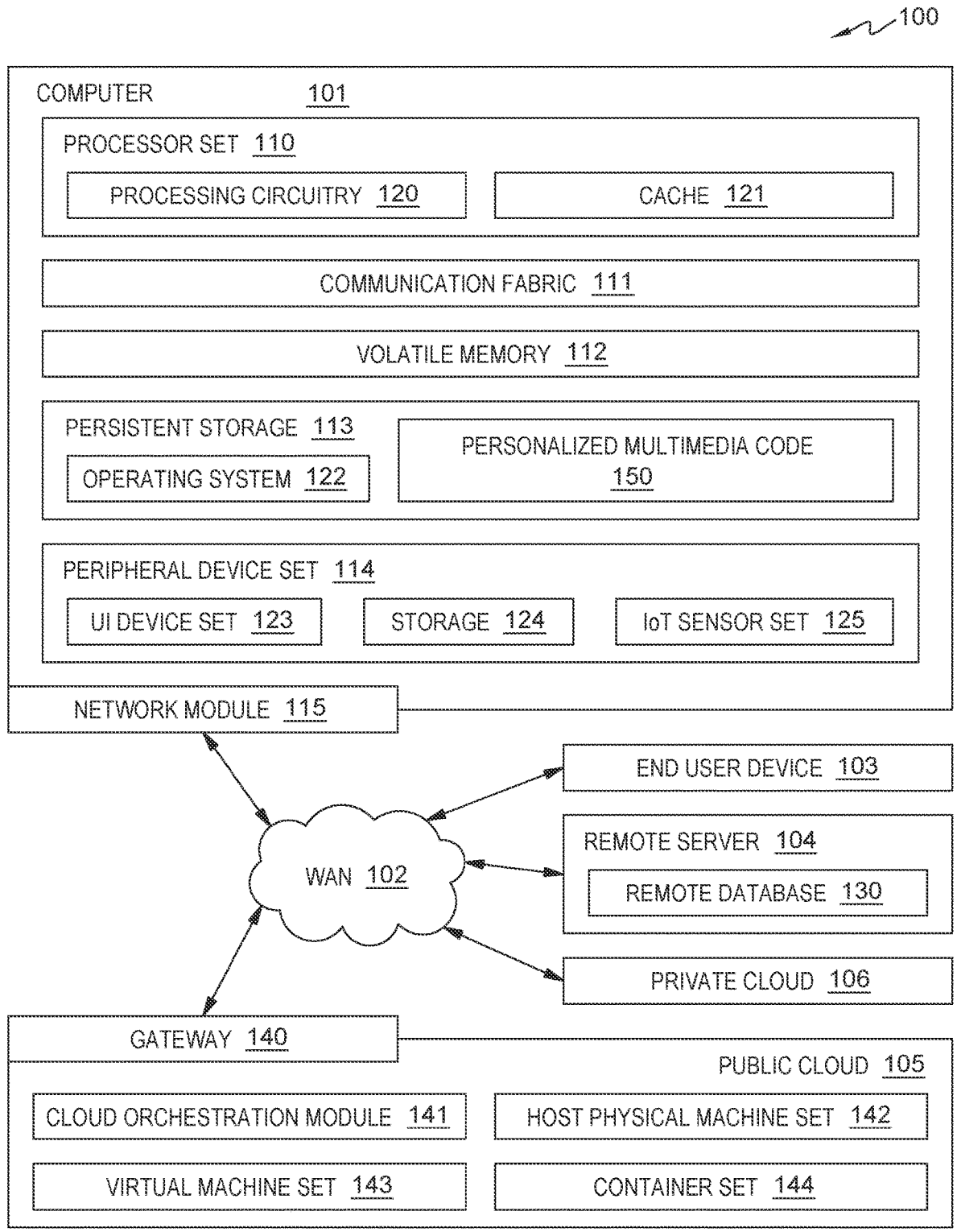
FIG. 1 is a functional block diagram of computing environment, generally designated 100, suitable for the execution of at least some of the computer code involved in performing the inventive methods, such as personalized multimedia code 150, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of broadcasting multimedia, and more particularly to, broadcasting personalized multimedia based, at least in part, on user preferences.

Typically, broadcasted television shows, games, events, and news are streamed for the general public and a wide variety of viewers. Oftentimes, there are multiple commentators or talk show hosts speaking in the broadcast. However, different viewers have different preferences, skill levels, knowledge, and previous understandings of certain topics. Based on these different preferences, skill levels, knowledge and previous understandings, different users may want to see or hear different things broadcasted on the same show, game, event, or the news.

In another example, electronic sports enables video game streamers to overlay commentary on their gameplay so they do not have to focus on engaging with their audience while simultaneously remaining competitive in a dynamic environment. For a user who has never played or watched a particular electronic sport before, explaining the different top-level strategies will not be as effective as explaining who the different characters are and what their abilities are.

In another example, a weather channel broadcast aims to cater to the general public to get information regarding weather conditions in order to plan commute or outside activities. However, some viewers may want straightforward information (example: most possible outcome, how many inches of snow, start and end period), while other viewers may want a more detailed explanation of different possibilities and root causes (break down of different possibilities and their percentages, specific combination of pressure and temperature causing precipitation, extra details).

Embodiments of the present invention create a personalized broadcast for the user based on analyzing the users' historical corpus via one or more of a convolutional neural network (CNN), recurrent neural network (RNN), and generative adversarial network (GAN) analysis. Embodiments of the present invention recognize the need for different types of audio and visual multimedia to suit different users based on experience level and preferences of the content they are viewing. For example, embodiments of the present invention broadcast a curated feed based on the differences between a first time viewer and an experienced veteran of the sport/event/etc. Embodiments of the present invention generate a broadcast discerning between preferred televised personalities.

Embodiments of the present invention train base machine learning model to perform image analysis and create an automated broadcast. Embodiments of the present invention create a historical corpus based on information on one or more of, but not limited to, a users' preferences, experience or skill levels, location, knowledge and previous understandings of certain topics, and other similar information. Embodiments of the present invention perform personalized training to create a personalized machine learning model using the base machine learning model and the historical corpus. In an embodiment, the received broadcast includes one or more individual or a combination of multimedia such as audio, image, or video data. Embodiments of the present invention analyze the received broadcast via a trained CNN, create a personalized text output based on a personalized RNN, and output audio via a personalized GAN. Embodiments of the present invention play the personalized test output or audio over the received broadcast. For example, embodiments of the present invention broadcast the generated personalized test or audio simultaneously while broadcasting the original video broadcast. Embodiments of the present invention analyze received feedback of the personalized text and audio output for the broadcast and retrain the personalized machine learning model.

For example, current sports broadcasts aim to cater to a wide variety of consumers and as a result, those who are 'experts' in a respective sport listen to the same broadcast as those who may have never watched the sport before. In order to provide a more personalized multimedia experience, embodiments of the present invention recognize and understand the subject's familiarity and preference with the content being broadcasted. Embodiments of the present invention dictate the complexity of the customized broadcast based on the user's level of familiarity with the broadcast. For example, the broadcast for a viewer who has never watched football before will focus primarily on explaining the rules, terminology, and objectives of the game. Contrarily, the same broadcast for a viewer who is an 'expert' in football will be broadcasted in-depth statistics, facts, etc., based on the user's historical corpus. In an embodiment, the historical corpus includes information on one or more users, user history, expertise levels, and preferences.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures.

FIG. 1 is a functional block diagram of computing environment, generally designated 100, suitable for the execution of at least some of the computer code involved in performing the inventive methods, such as new personalized multimedia code 150, in accordance with at least one embodiment of the present invention. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
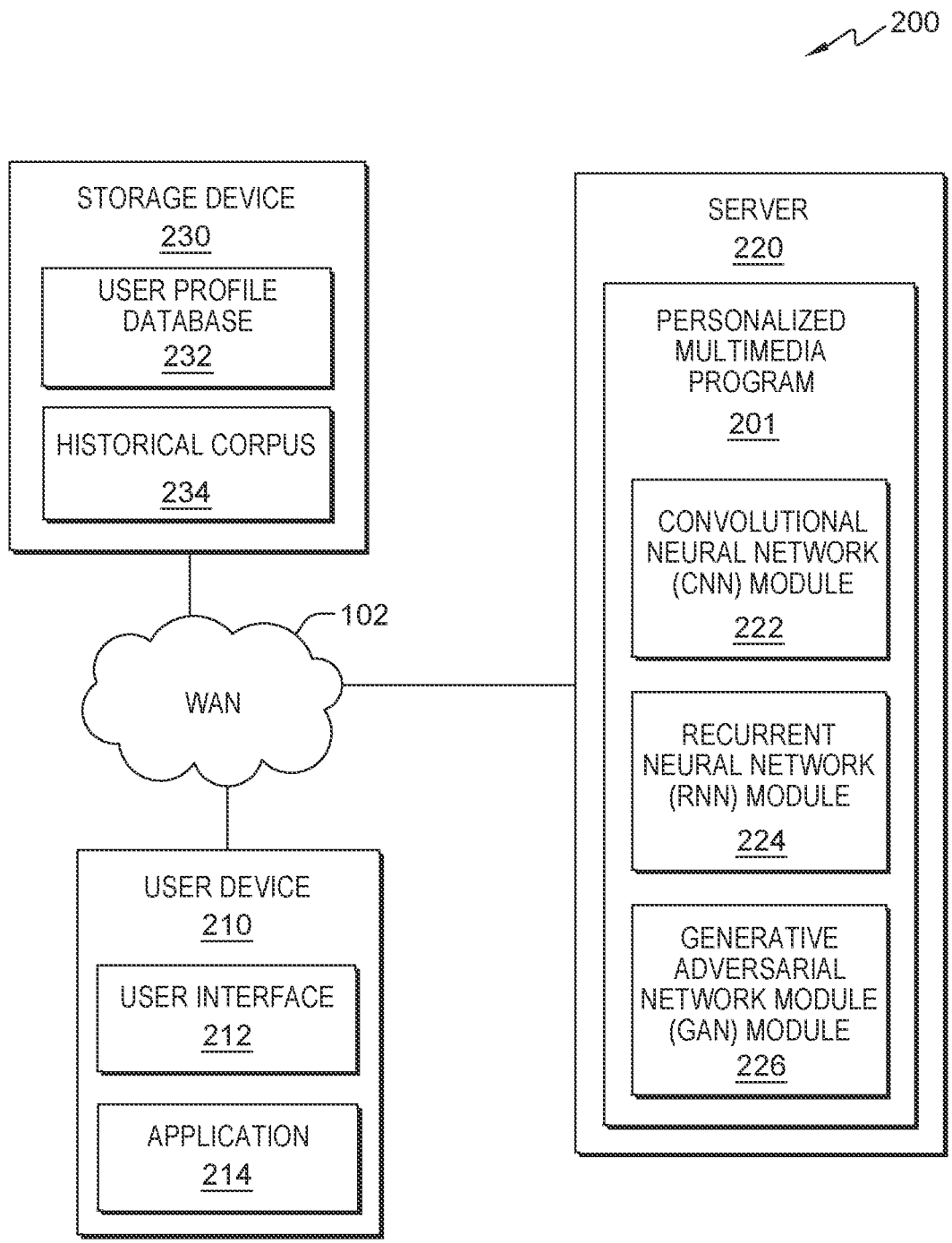
FIG. 2 is a functional block diagram of an exemplary personalized multimedia system, generally designated 200, suitable for operation of a personalized multimedia program 201, in accordance with at least one embodiment of the present invention.

FIG. 2 is a functional block diagram of an exemplary personalized multimedia system, generally designated 200, suitable for operation of a personalized multimedia program 201, in accordance with at least one embodiment of the present invention. Personalized multimedia system 200 may be implemented in a computing environment, such as computing environment 100, as described with reference to FIG. 1. FIG. 2 provides an illustration of only one implementation and does not imply any limitations with regard to the environments in which different embodiments may be implemented. Many modifications to the depicted environment may be made by those skilled in the art without departing from the scope of the present invention as recited by the claims.

Personalized multimedia system 200 includes user device 210, server 220, and storage device 230 interconnected over network 102. User device 210 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 210 can represent any programmable electronic device or combination of programmable electronic devices capable of executing machine readable program instructions and communicating with server 220, storage device 230 and other devices (not depicted) via a network, such as WAN 102. In an embodiment, user device 210 is representative of end user device, such as EUD 103 depicted and described previously in detail with respect to FIG. 1.

User device 210 further includes user interface 212 and application 214. User interface 212 is a program that provides an interface between a user of an end user device, such as user device 210, and a plurality of applications that reside on the device (e.g., application 214). A user interface, such as user interface 212, refers to the information (such as graphic, text, and sound) that a program presents to a user, and the control sequences the user employs to control the program. A variety of types of user interfaces exist. In one embodiment, user interface 212 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 212 is a script or application programming interface (API).

Application 214 can be representative of one or more applications (e.g., an application suite) that operate on user device 210. In an embodiment, application 214 is representative of one or more applications (e.g., multimedia streaming applications, social media applications, sports applications, and news applications) located on user device 210. In various example embodiments, application 214 can be an application that a user of user device 210 utilizes to access a multimedia streaming application or news website to view any multimedia with text, audio, and/or video data. In an embodiment, application 214 can be a client-side application associated with a server-side application running on server 220 (e.g., a client-side application associated with personalized multimedia program 201). In an embodiment, application 214 can operate to perform processing steps of personalized multimedia program 201 (i.e., application 214 can be representative of personalized multimedia program 201 operating on user device 210).

Server 220 is configured to provide resources to various computing devices, such as user device 210. In general, server 220 represents any programmable electronic device or combination of programmable electronic devices capable of executing machine readable program instructions and communicating with each other, as well as with user device 210, storage device 230, and other computing devices (not shown) via a network, such as WAN 102. In an embodiment, server 220 can be a management server, a web server, an application server, a mobile device, or any other electronic device or computing system capable of receiving, sending, and processing data. In an embodiment, server 220 represents a server computing system utilizing multiple computers as a server system. In an embodiment, server 220 represents a computing system utilizing clustered computers and components (e.g., database server computer, application server computer, web server computer, webmail server computer, media server computer, etc.) that act as a single pool of seamless resources. In an embodiment, server 220 is representative of computer 101 depicted in FIG. 1, that is capable of running a program and accessing a network or querying a database.

In various embodiments, storage device 230 is a secure data repository for persistently storing user profile information utilized by various applications and user devices of a user, such as application 214 and user device 210. In an embodiment, storage device 230 is representative of one or more databases, such as remote database 130 depicted in FIG. 1. In an embodiment, storage device 230 includes user profile database 232 and historical corpus 234. Storage device 230 may be implemented using any volatile or non-volatile storage media known in the art for storing data. For example, storage device 230 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 230 may be implemented with any suitable storage architecture known in the art, such as a relational database, an object-oriented database, or one or more tables.

In an embodiment, personalized multimedia program 201 may be configured to access various data sources, such as user profile database 232 and historical corpus 234, that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, personalized multimedia program 201 enables the authorized and secure processing of personal data. In an embodiment, personalized multimedia program 201 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, personalized multimedia program 201 provides information regarding personal data and the nature (e.g., type, scope, purpose, duration, etc.) of the processing. In an embodiment, personalized multimedia program 201 provides a user with copies of stored personal data. In an embodiment, personalized multimedia program 201 allows for the correction or completion of incorrect or incomplete personal data. In an embodiment, personalized multimedia program 201 allows for the immediate deletion of personal data.

In an embodiment, user profile database 232 includes information on one or more user profiles. In an embodiment, user profile database 232 includes information on one or more user preferences, location, skill levels, knowledge, expertise, and previous understandings of certain topics. For example, if personalized multimedia program 201 receives user input that a user prefers commentator A over commentator B, personalized multimedia program 201 stores information that commentator A is a preferred preference for the user in user profile database 232. In another example, if personalized multimedia program 201 receives user input that a user watches the weather channel every morning to determine a driving commute route, personalized multimedia program 201 stores information on the reason why the user watches the weather channel in user profile database 232. In another example, if personalized multimedia program 201 receives user input that a user has played and watched golf for 20 years, personalized multimedia program 201 stores information that the user has an advanced understanding of golf in user profile database 232.

In an embodiment, personalized multimedia program 201 determines the user's location and stores the information in user profile database 232. In an embodiment, personalized multimedia program 201 clusters or groups one or more users together via various clustering algorithms, such as K-means, to determine one or more similarities between users. A k-means clustering is a method of vector quantization, originally from signal processing, that aims to partition n observations into k clusters in which each observation belongs to the cluster with the nearest mean, serving as a prototype of the cluster. In an embodiment, personalized multimedia program 201 utilizes a clustering algorithm to generate one or more groups wherein users are grouped into a cluster according to user preferences. In another embodiment, personalized multimedia program 201 clusters one or more users together if the number of similar user preferences is above a predetermined threshold. For example, if two user's user preferences include information both users live in the same city and prefer golf, if the predetermined threshold for clustering users together is two similar user preferences, personalized multimedia program 201 clusters these two users together. In an embodiment, personalized multimedia program 201 dynamically alters the audio output based, at least part, on the one or more generated groups. In another example, personalized multimedia program 201 determines that a group of users will all be located in the same place or listening to the same multimedia broadcast. In this example, personalized multimedia program 201 personalized the multimedia broadcast based on the group of users. In an example, personalized multimedia program 201 determines the users lives in a geographic location that prefers referring to the beverage "soda" as "pop." In an embodiment, personalized multimedia program stores information on determined clusters of one or more users in user profile database 232.

In an embodiment, user profile database 232 includes information on a user's electronic activity. In an embodiment, a user's electronic activity includes, but is not limited to, multimedia streaming, query searches, application usage, and social media activity. In an example, personalized multimedia program 201 determines the user follows twenty particular professional basketball players on social media. Here, personalized multimedia program 201 further determines the user has an above average knowledge of basketball and stores this information in user profile database 232. In another example, user profile database 232 includes information on the frequency a user streams a specific broadcast.

As an example, personalized multimedia program 201 determines the user's expertise level for a type of multimedia content and stores the information in user profile database 232. For example, personalized multimedia program 201 categorizes a user's level of understanding or expertise with regards to a particular multimedia content as beginner, intermediate, or expert. In an embodiment, personalized multimedia program 201 determines the user's expertise level for a type of multimedia based on a predetermined threshold. For example, if the user watches more than ten hours, games, or shows of a particular type of multimedia, personalized multimedia program 201 classifies the user as an intermediate for the particular type of multimedia. As another example, personalized multimedia program 201 determines a user streams tennis matches above a predetermined threshold. Here, personalized multimedia program 201 further determines the user is an expert on tennis matches and would need less explanation of the basics. On the contrary, if personalized multimedia program 201 determines a user streams a type of multimedia below a predetermined threshold, personalized multimedia program 201 determines a user is a beginner for that type of multimedia and would need further explanation of the basics, such as definitions and rules of the game.

In an embodiment, historical corpus 234 includes information on previously tagged and annotated multimedia. In an embodiment, historical corpus 234 includes information on previously generated personalized audio. For example, personalized multimedia program 201 generates personalized audio based on a received multimedia and information in user profile database 232 and stores the generated personalized audio in historical corpus 234. In an embodiment, historical corpus 234 includes information on feedback received on one or more generated personalized audio.

In an embodiment, personalized multimedia program 201 includes convolutional neural network (CNN) module 222, recurrent neural network (RNN) module 224, and generative adversarial network module (GAN) 226. In an embodiment, CNN module 222 performs image analysis on received multimedia. In an embodiment, CNN module 222 performs image analysis on each of the frames synched up to the audio data included in the multimedia data. In an embodiment, CNN module 222 is trained using previously determined multimedia from historical corpus 234. In an embodiment, CNN module 222 performance is measured by a roots mean square error (RMSE) or any other known in the art error detection model. A roots mean square error or root-mean-square deviation is a frequently used measure of the differences between values predicted by a model or an estimator and the values observed. In an embodiment, personalized multimedia program 201 utilizes an object detection module to run in parallel with CNN module 222 and RNN module 224 to detect objects in each frame of the multimedia data.

In an embodiment, RNN 224 module tags the audio from the multimedia. In an embodiment, RNN 224 module tags various aspects of the training data so as to be able to determine the context of audio data from multimedia data being broadcast to a user. For instance, when someone is explaining a rule, then that would be marked as explanatory. In an embodiment, personalized multimedia program 201 automatically identifies via CNN module 222, for instance, if a referee goes onto the screen. Then personalized multimedia program 201 generates a time interval around that frame tagging it as relating to an "explanatory" context. In an embodiment, the generated time interval is the amount of time the audio pertains to the tag. For example, if personalized multimedia program 201 determines that for two sentences a commentator is speaking about the background of a player, if the amount of time it takes the commentator to speak the two sentences is, for example, 30 seconds, then personalized multimedia program 201 generates a time interval of 30 seconds for the audio tag of "player background" associated with the particular number of image frames related to the two sentences.

In an embodiment, GAN module 226 is a pair of neural networks that, given a training set, compete within one another to generate new data with the same characteristics as the training set. In an embodiment, GAN module 226 is utilized to regenerate multimedia audio. In an embodiment, GAN module 226 is trained using previously identified tagged audio and multimedia. For example, GAN module 226 is trained using the base training model. In an embodiment, GAN module 226 is trained to generate a personalized audio output from one or more received multimedia. For example, generating a personalized audio output for a particular viewer which includes audio from one or more speakers for a daily news show.

In an embodiment, GAN module 226 is trained in parallel with CNN module 222 and RNN module 224 to create various models of text-to-speech, depending on the users' desired voices. For example, GAN module 226 is trained on a specific sportscaster audio package (i.e., each commentator has a specific package). In an embodiment, personalized multimedia program 201 generates a personalized GAN from the user information and one or more of the training models, for example, the base training model or the personalized training model.

In an embodiment, personalized multimedia program 201 trains a first machine learning model. In an embodiment, a first machine learning model is the base training model. In an embodiment, personalized multimedia program 201 trains a machine learning model to create an automated broadcast from image analysis. In an embodiment, personalized multimedia program 201 trains a machine learning model by utilizing CNN module 222. In an embodiment, personalized multimedia program 201 trains a training model using CNN module 222 to analyze each frame of multimedia data to tag key words associated with images. In an embodiment, personalized multimedia program 201 analyses the context of the topic based on the one or more tagged key words associated with the video frame or corresponding audio. For example, if personalized multimedia program 201 determines the multimedia is of a football game, determines a flag on the play, and determines the announcers are talking about the flag based on the tagged key words. In this example, personalized multimedia program 201 further determines the context of "flag on player number 20 for false start."

In an embodiment, CNN module 222 performs image analysis on the received multimedia. In an embodiment, CNN module 222 performs image analysis of each of the frame of the received multimedia to determine one or more objects or people in the frame. In an embodiment, CNN module 222 performs image analysis of each of the frames synched up to the received audio from the multimedia. In an embodiment, CNN module 222 is trained on previously determined multimedia from historical corpus 234.

In an embodiment, personalized multimedia program 201 receives multimedia captured from multiple camera feeds. Meaning, the multimedia contains feeds from multiple camera angels. For example, multiple cameras placed at different angels filming a talk show. In an embodiment, personalized multimedia program 201 utilizes any digital twin machine learning system known in the art to combine the one or more different camera angel multimedia. A digital twin is a digital representation of an intended or actual real-world physical product, system, or process that serves as the effectively indistinguishable digital counterpart of it for practical purposes, such as simulation, integration, testing, monitoring, and maintenance.

In an embodiment, personalized multimedia program 201 receives information from one or more IoT devices. For example, IoT devices are placed on one or more people involved in an event being filmed and personalized multimedia program 201 receives information from the IoT devices, such as a player's location on the field.

In an embodiment, personalized multimedia program 201 trains a first machine learning model utilizing RNN module 224. In an embodiment, personalized multimedia program 201 utilizes RNN module 224 to convert the audio of the multimedia to text using speech-to-text software. In an embodiment, personalized multimedia program 201 trains a training model using RNN module 224 to generate and analyze key words together from the audio about the multimedia broadcast. For example, based on the frequency which the user watches the program, RNN module 224 will increase the amount of "explanatory" text injected into the personalized multimedia broadcast. In an embodiment, the output of RNN module 224 is text which is used by GAN module 226.

In an embodiment, personalized multimedia program 201 trains a first machine learning model utilizing GAN module 226. In an embodiment, GAN module 226 trains the third machine learning model to generate an audio output based on the broadcast. In an embodiment, GAN module 226 trains the third machine learning model in parallel with training the first and second machine learning models via CNN module 222 and RNN module 224, respectively, to create various personalized multimedia broadcast data based, at least in part, on the user's preferences and knowledge level.

In an embodiment, personalized multimedia program 201 utilizes RNN module 224 to translate the text to speech via a personalized GAN, such as GAN module 226. In an embodiment, personalized multimedia program 201 generates audio with one or more commentators' voices based, at least in part, on the user's profile. For example, if a user's profile indicated the user likes two out of the five commentators, GAN module 226 is trained to generate an audio with the two out of the five commentators in the original audio. In an embodiment, if there is a sufficient amount of training data of the user's own voice, GAN module 226 is trained to generate an audio based on the user's own voice.

In an embodiment, personalized multimedia program 201 trains a base training model. In an embodiment, personalized multimedia program 201 analyzes the received multimedia using CNN module 222, creates a text based on the received multimedia using RNN module 224, and outputs audio via GAN module 226. In an embodiment, personalized multimedia program 201 utilizes the base training model to train the personalized training model.

In an embodiment, personalized multimedia program 201 trains a personalized training model. In an embodiment, personalized multimedia program 201 trains a personalized training model by analyzing the received multimedia using CNN module 222, creating a personalized text based on RNN module 224, and outputting the personalized audio using GAN module 226. In an embodiment, personalized multimedia program 201 plays the personalized audio over the original video from the received multimedia.

As an example, personalized multimedia program 201 receives user input preferences that a user is a beginner in football and the users favorite commentator is Bob. Personalized multimedia program 201 receives a multimedia broadcast of a football game with Alice, Bob, and Carl as commentators. In this example, personalized multimedia program 201 utilizes CNN module 222 and RNN module 224 to perform image analysis and speech to text to tag certain words and determine the context of the images and audio presented during the multimedia broadcast. Personalized multimedia program 201 utilizes CNN module 222 and RNN module 224 to determine a touchdown was scored. In this example, personalized multimedia program 201 utilizes GAN module 226 to generate a personalized output audio based on the user being an expert in football and Bob being the user's favorite commentator. For example, personalized multimedia program 201 generates a personalized output audio that uses Bob as a commentator for 80% of the audio with a complex, in-depth explanation of the scoring play.

In an embodiment, personalized multimedia program 201 receives feedback based on the personalized output multimedia data. In an embodiment, the feedback is based on a scale (e.g., numerical), selected category (good or bad) or above/below a predetermined threshold. In an embodiment, personalized multimedia program 201 receives manual feedback. In these embodiments, personalized multimedia program 201 receives user input feedback on times or parts of the personalized text, audio, or image data. For example, during a penalty of a football game, if the user selected "bad" because they did not like that the definition of the penalty was not explained, personalized multimedia program 201 receives this feedback from the user as user input. In an embodiment, personalized multimedia program 201 retrains one or more of the personalized machine learning models with the received feedback from the user input.

In an embodiment, personalized multimedia program 201 receives mass feedback. In an embodiment, personalized multimedia program 201 receives feedback from a large sample size of users. In an embodiment, personalized multimedia program 201 retrains one or more of the machine learning model with the received mass feedback if the same feedback is received from a number of viewers above a predetermined threshold.

In an embodiment, personalized multimedia program 201 receives user preference information. In an embodiment, personalized multimedia program 201 adapts the personalized training machine learning model according to the user preference information. In an embodiment, personalized multimedia program 201 groups users into a cluster according to user preferences and dynamically alters at least one machine learning model according to the cluster. In an embodiment, personalized multimedia program 201 groups users into a cluster using a k-means. For example, personalized multimedia program 201 groups users into a cluster based on location or user preferences. In an embodiment, personalized multimedia program 201 performs an analysis on audio and video data using the first trained machine learning model. In an embodiment, personalized multimedia program 201 trains the first machine learning model to analyze video data to extract objects. In an embodiment, personalized multimedia program 201 generates a text output according to the analysis using the first machine learning model adapted according to the user preferences. In an embodiment, personalized multimedia program 201 trains the first machine learning model to extract intents from audio data. For example, personalized multimedia program 201 utilizes CNN module 222 to obtain information from the video data and extract objects. The output of CNN module 222 is then passed through RNN module 224 to generate the text associated with the image. For example, if the video shows a football, RNN module 224 produces the word "football." Further, the audio from the video is converted to text via various existing speech-to-text APIs, for example RNN module 224. In this example, personalized multimedia program 201 receives user input to have a sentence be read in the voice of commentator A. Here, personalized multimedia program 201 utilizes the text output of RNN module 224 in the style of commentator A and this output is put into GAN module 226 to convert the text into speech in the voice of commentator A.

In an embodiment, personalized multimedia program 201 generates an audio output of the text using the first machine learning model. In an embodiment, personalized multimedia program 201 trains the first machine learning model to generate audio data according to the generated text and user preferences. In an embodiment, personalized multimedia program 201 retrains or alters the first machine learning model according to feedback from one or more users. In an embodiment the first machine learning model is the base training model and the base training model is used to train the second machine learning model, the personalized training model.

In an embodiment, personalized multimedia program 201 receives real time audio and video data, detects objects in the video data, generates text, and generates audio output according to the real time audio and video.

Figure 3:
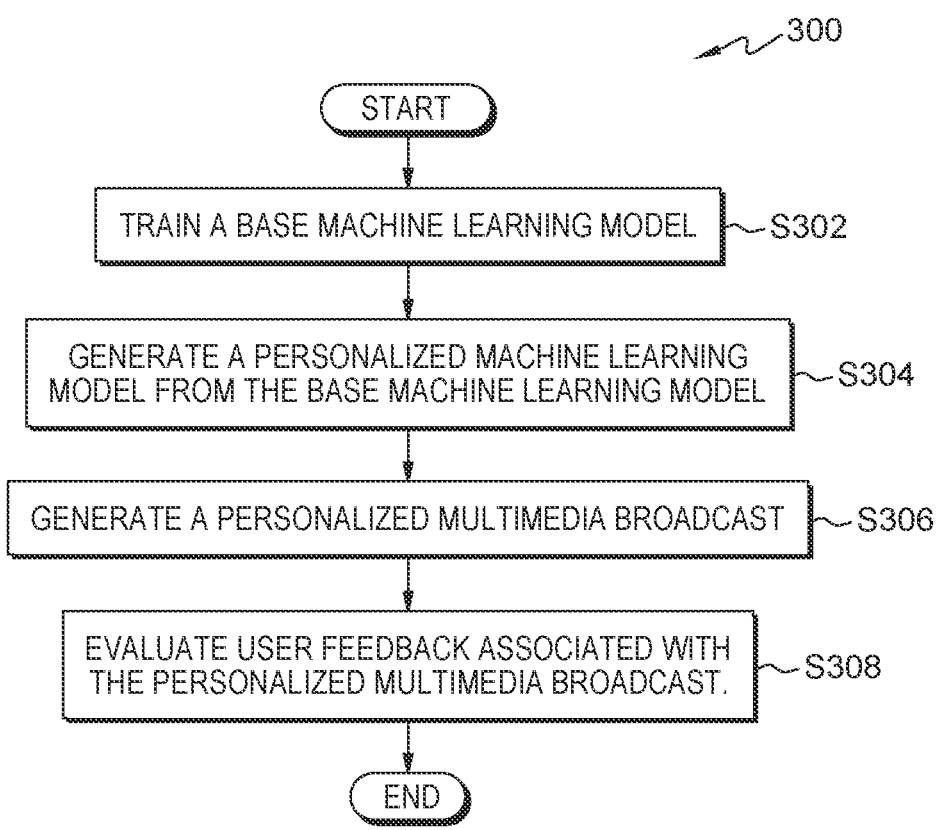
FIG. 3 is a flow chart diagram depicting operational steps for personalized multimedia program 201, generally designated 300, in accordance with at least one embodiment of the present invention.

FIG. 3 is a flow chart diagram depicting operational steps for personalized multimedia program 201, generally designated 300, in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S302, personalized multimedia program 201 trains a base machine learning model. In an embodiment, personalized multimedia program 201 trains the base machine learning model using CNN module 222, RNN module 224, and GAN module 226. In an embodiment, personalized multimedia program 201 trains the base machine learning model to perform image analysis and create an automated broadcast.

At step S304, personalized multimedia program 201 generates a personalized machine learning model from the base machine learning model.

At step S306, personalized multimedia program 201 generates a personalized multimedia broadcast. In an embodiment, personalized multimedia program 201 generates the personalized broadcast based, at least in part, on user input of user expertise, skills, knowledge, and preferences.

At step S308, personalized multimedia program 201 evaluates user feedback associated with the personalized multimedia broadcast. In an embodiment, personalized multimedia program 201 retrains the base model or the personalized model based, at least in part, on the received user feedback.

Figure 4:
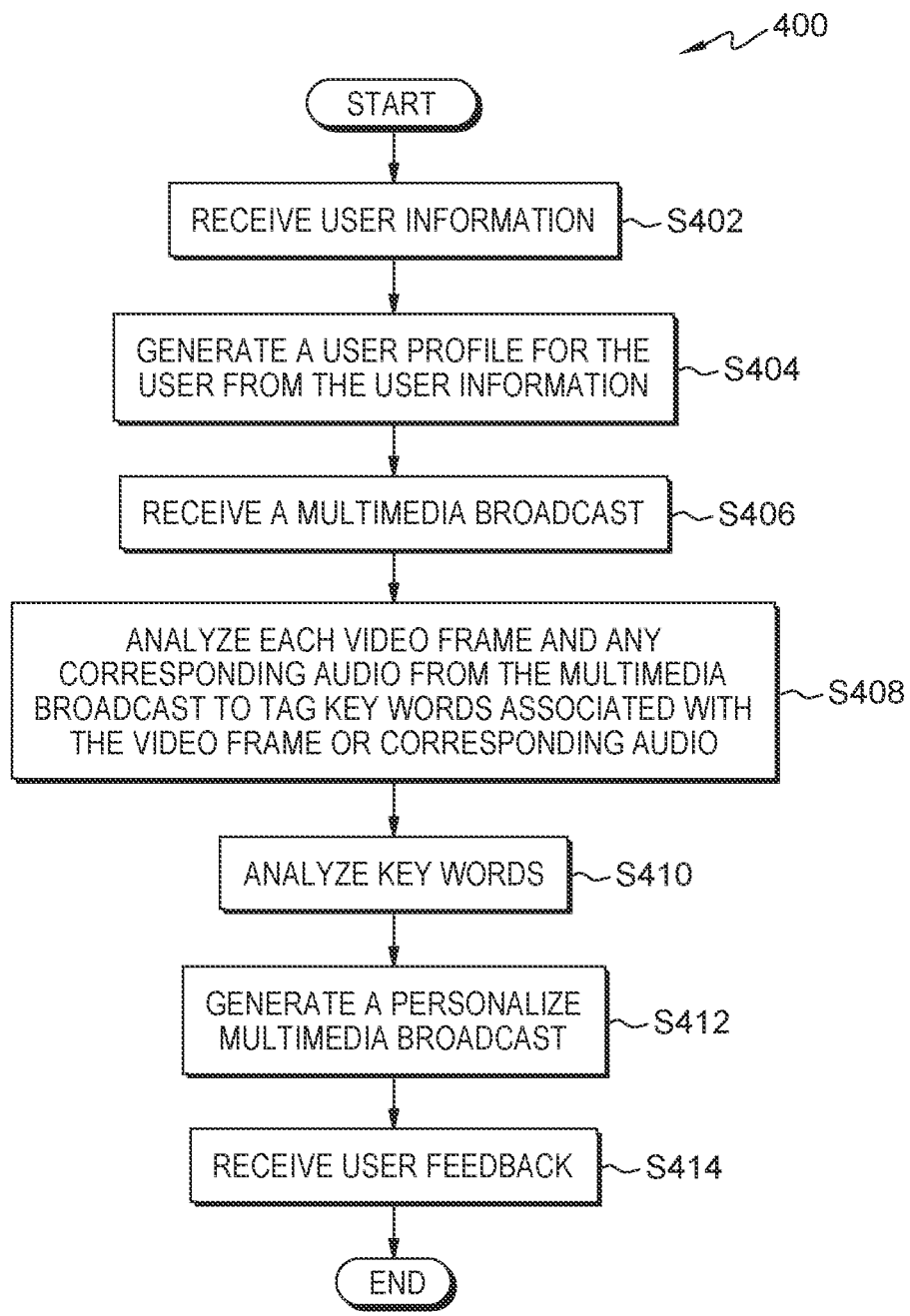
FIG. 4 is a flow chart diagram depicting operational steps for personalized multimedia program 201, generally designated 400, in accordance with at least one embodiment of the present invention.

FIG. 4 is a flow chart diagram depicting operational steps for personalized multimedia program 201, generally designated 400, in accordance with at least one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

At step S402, personalized multimedia program 201 receives user information. In an embodiment, user information includes user input of user expertise, skills, knowledge, and preferences. In an embodiment user information includes a user's electronic activity, which includes multimedia streaming, query searches, application usage, and social media activity.

At step S404, personalized multimedia program 201 generates a user profile for the user from the user information. In an embodiment, the user profile is based, at least in part, on the user information. In an embodiment, personalized multimedia program 201 stores the user profile in user profile database 232.

At step S406, personalized multimedia program 201 receives a multimedia broadcast. In an embodiment, the multimedia broadcast includes one or more of audio data, image data, or video data.

At step S408, personalized multimedia program 201 analyzes each video frame and any corresponding audio from the multimedia broadcast to tag key words associated with the video frame or corresponding audio.

At step S410, personalized multimedia program 201 analyze key words. In an embodiment, personalized multimedia program 201 analyses the context of the topic based on the one or more tagged key words associated with the video frame or corresponding audio.

At step S412, personalized multimedia program 201 generates a personalized multimedia broadcast. In an embodiment, generating the personalized multimedia broadcast includes personalizing one or more of the audio, image, or video data broadcasted to a particular user.

At step S414, personalized multimedia program 201 receives user feedback. In an embodiment, user feedback is received from one or more users. In an embodiment, personalized multimedia program 201 retrains one or more training models, such as the base training model or the personalized training model, with the user feedback.

Figure 5:
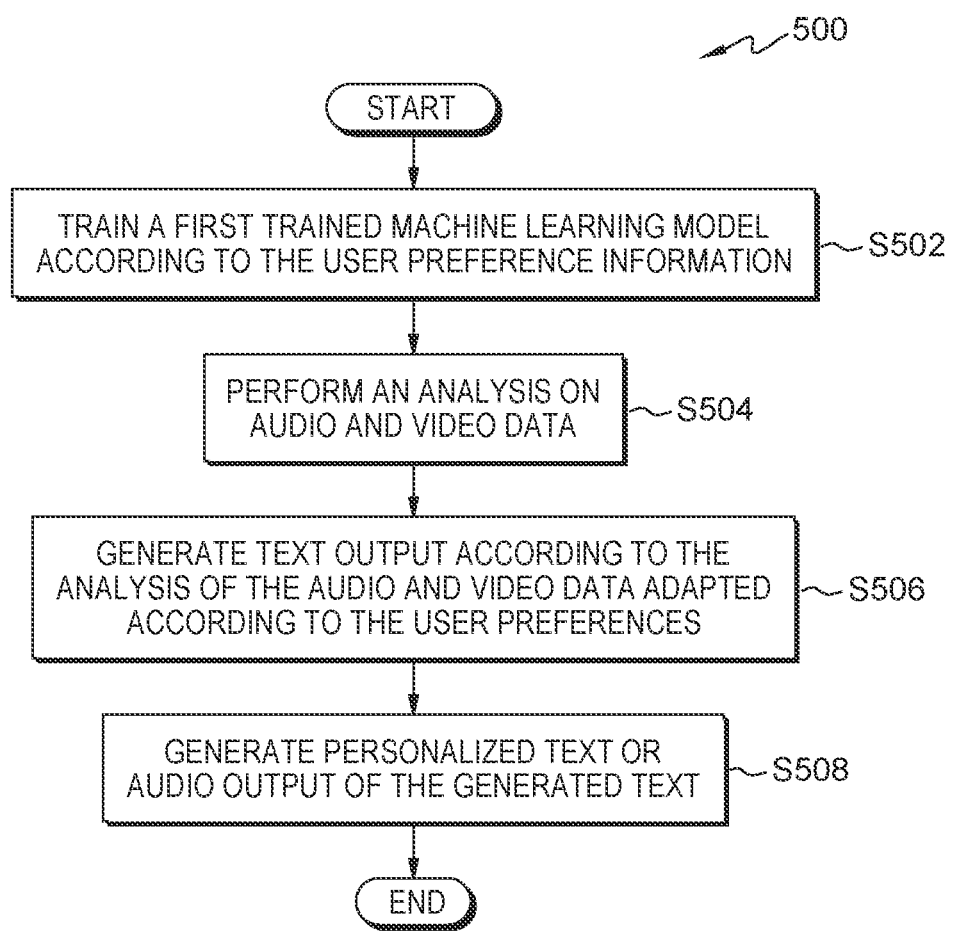
FIG. 5 is a flow chart diagram depicting operational steps for personalized multimedia program 201, generally designated 500, in accordance with at least one embodiment of the present invention.

FIG. 5 is a flow chart diagram depicting operational steps for generating a personalized model for personalized multimedia program 201, generally designated 500, in accordance with at least one embodiment of the present invention. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

At step S502, personalized multimedia program 201 trains a first trained machine learning model according to the user preference information. In an embodiment, the first machine learning model is trained using a CNN, RNN, and GAN.

At step S504, personalized multimedia program 201 performs an analysis on audio and video data. In an embodiment, personalized multimedia program 201 trains a second machine learning model by the first machine learning model. In an embodiment, personalized multimedia program 201 utilizes a CNN to analyze the audio and video data.

At step S506, personalized multimedia program 201 generates a text output according to the analysis of the audio and video data adapted according to the user preferences. In an embodiment, personalized multimedia program 201 utilizes a RNN to generate a text output according to the analysis of the audio and video data.

At step S508, personalized multimedia program 201 generates personalized text or audio output of the generated text. In an embodiment, personalized multimedia program 201 utilizes a GAN to generate personalized audio output.

What is claimed is:

1. A computer-implemented method for generating personalized multimedia, the computer implemented method comprising:
   determining one or more multimedia preferences associated with a user;
   analyzing multimedia data to generate a personalized audio output based, at least in part, on the one or more multimedia preferences associated with the user, wherein the one or more multimedia preferences are based on the user's level of familiarity with a broadcast and user preferences associated with content being viewed; and
   modifying the multimedia data to include the generated personalized audio output using a generative adversarial network.

2. The computer-implemented method of claim 1, wherein analyzing the multimedia data further comprises:
   analyzing one or more image frames of the multimedia data to determine a personalized text output corresponding to the one or more image frames based, at least in part, on the one or more multimedia preferences, wherein the personalized audio output is further generated based on the determined personalized text output.

3. The computer-implemented method of claim 2, wherein analyzing the one or more image frames of the multimedia data further comprises:
   training a first machine learning model to analyze the one or more image frames of the multimedia output person, wherein training the first machine learning model comprises;
   utilizing a convolutional neural network to analyze the multimedia to determine one or more text outputs; and
   utilizing a recurrent neural network to tag one or more key words associated with the multimedia data.

4. The computer-implemented method of claim 3, wherein training the first machine learning model further comprises training the first machine learning model to utilize the recurrent neural network to analyze the multimedia data to extract one or more objects from the one or more image frames.

5. The computer-implemented method of claim 3, wherein training the first machine learning model further comprises training the first machine learning model to extract intents from audio data corresponding to the one or more image frames.

6. The computer-implemented method of claim 3, further comprising:
receiving user feedback associated with the modified multimedia data; and
dynamically altering the first machine learning model based, at least in part, on the received user feedback.

7. The computer-implemented method of claim 3, further comprising training a second machine learning model to output personalized audio data based, at least in part, on the one or more text outputs generated by the first machine learning model, wherein training the second machine learning model comprises:
utilizing a convolutional neural network to analyze the one or more text outputs corresponding to the one or more image frames to determine one or more corresponding audio outputs;
utilizing a recurrent neural network to tag one or more key words associated with the one or more corresponding audio outputs; and
modifying the one or more corresponding audio outputs to generate one or more personalized audio outputs.

8. The computer-implemented method of claim 1, further comprising:
utilizing a clustering algorithm to generate one or more groups wherein users are grouped into a cluster according to user preferences; and
dynamically altering the audio output based, at least part, on the one or more generated groups.

9. A computer program product for generating personalized multimedia, the computer program product comprising one or more computer readable storage media and program instructions stored on the one or more computer readable storage media, the program instructions including instructions to:
determine one or more multimedia preferences associated with a user;
analyzing multimedia data to generate a personalized audio output based, at least in part, on the one or more multimedia preferences associated with the user, wherein the one or more multimedia preferences are based on the user's level of familiarity with a broadcast and user preferences associated with content being viewed; and
modify the multimedia data to include the generated personalized audio output using a generative adversarial network.

10. The computer program product of claim 9, wherein analyzing the multimedia data further comprises instructions to:
analyze one or more image frames of the multimedia data to determine a personalized text output corresponding to the one or more image frames based, at least in part, on the one or more multimedia preferences, wherein the personalized audio output is further generated based on the determined personalized text output.

11. The computer program product of claim 10, wherein the instructions to analyze the one or more image frames of the multimedia data further comprises instructions to:
train a first machine learning model to analyze the one or more image frames of the multimedia output person, wherein training the first machine learning model comprises:
utilize a convolutional neural network to analyze the multimedia to determine one or more text outputs; and
utilize a recurrent neural network to tag one or more key words associated with the multimedia data.

12. The computer program product of claim 11, wherein training the first machine learning model further comprises training the first machine learning model to utilize the recurrent neural network to analyze the multimedia data to extract one or more objects from the one or more image frames.

13. The computer program product of claim 11, wherein training the first machine learning model further comprises training the first machine learning model to extract intents from audio data corresponding to the one or more image frames.

14. The computer program product of claim 11, further comprising:
receiving user feedback associated with the modified multimedia data; and
dynamically altering the first machine learning model based, at least in part, on the received user feedback.

15. The computer program product of claim 11, further comprising training a second machine learning model to output personalized audio data based, at least in part, on the one or more text outputs generated by the first machine learning model, wherein training the second machine learning model comprises:
utilizing a convolutional neural network to analyze the one or more text outputs corresponding to the one or more image frames to determine one or more corresponding audio outputs;
utilizing a recurrent neural network to tag one or more key words associated with the one or more corresponding audio outputs; and
modifying the one or more corresponding audio outputs to generate one or more personalized audio outputs.

16. The computer program product of claim 9, further comprising instructions to:
utilize a clustering algorithm to generate one or more groups wherein users are grouped into a cluster according to user preferences; and
dynamically altering the audio output based, at least part, on the one or more generated groups.

17. A computer system for generating personalized multimedia, comprising:
one or more computer processors;
one or more computer readable storage media;
computer program instructions;
the computer program instructions being stored on the one or more computer readable storage media for execution by the one or more computer processors; and
the computer program instructions including instructions to:
determine one or more multimedia preferences associated with a user;
analyze multimedia data to generate a personalized audio output based, at least in part, on the one or more multimedia preferences associated with the user; and, wherein the one or more multimedia preferences are based on the user's level of familiarity with a broadcast and user preferences associated with content being viewed; and modify the multimedia data to include the generated personalized audio output using a generative adversarial network.

18. The computer system of claim 17, wherein analyzing the multimedia data further comprises instructions to:
analyze one or more image frames of the multimedia data to determine a personalized text output corresponding to the one or more image frames based, at least in part, on the one or more multimedia preferences, wherein the personalized audio output is further generated based on the determined personalized text output.

19. The computer system of claim 18, wherein the instructions to analyze the one or more image frames of the multimedia data further comprises instructions to:
train a first machine learning model to analyze the one or more image frames of the multimedia output person, wherein training the first machine learning model comprises:
utilize a convolutional neural network to analyze the multimedia to determine one or more text outputs; and
utilize a recurrent neural network to tag one or more key words associated with the multimedia data.

20. The computer system of claim 17, further comprising instructions to:
utilize a clustering algorithm to generate one or more groups wherein users are grouped into a cluster according to user preferences; and
dynamically altering the audio output based, at least part, on the one or more generated groups.

* * * * *